US011165969B1

(12) United States Patent
Nelson et al.

(10) Patent No.: US 11,165,969 B1
(45) Date of Patent: Nov. 2, 2021

(54) SYSTEM AND METHOD FOR ADDING AUXILIARY LIGHTS TO A CAMERA TO CREATE FLUORESCENCE IN SELECTED FEATURES OF A CAPTURED IMAGE

(71) Applicant: Sky Castle Toys LLC, Seattle, WA (US)

(72) Inventors: Martin Levin Nelson, Seattle, WA (US); Webb T. Nelson, Seattle, WA (US)

(73) Assignee: Sky Castle Toys LLC, Seattle, WA (US)

( * ) Notice: Subject to any disclaimer, the term of this patent is extended or adjusted under 35 U.S.C. 154(b) by 0 days.

(21) Appl. No.: 17/178,230

(22) Filed: Feb. 17, 2021

Related U.S. Application Data (60) Provisional application No. 63/060,562, filed on Aug. 3, 2020.

(51) Int. Cl.
*H04N 5/235* (2006.01)
*H04N 5/225* (2006.01)
*G03B 15/00* (2021.01)
*H04M 1/02* (2006.01)

(52) U.S. Cl.
CPC .......... *H04N 5/2354* (2013.01); *G03B 15/00* (2013.01); *H04N 5/2251* (2013.01); *H04N 5/2257* (2013.01); *H04M 1/0264* (2013.01)

(58) Field of Classification Search
CPC ........................ H04N 5/2256; H04N 6/2354
USPC .................................................. 348/370, 371
See application file for complete search history.

(56) References Cited

U.S. PATENT DOCUMENTS

| | | | |
|---|---|---|---|
| 6,301,044 B1 * | 10/2001 | Huber .................. | H04N 13/337 |
| | | | 359/485.03 |
| 7,450,250 B2 * | 11/2008 | Venkatesh ............... | G01J 3/427 |
| | | | 356/620 |
| 8,550,649 B2 * | 10/2013 | Nelson ................... | G02C 11/04 |
| | | | 362/105 |
| 8,746,914 B2 | 6/2014 | Nelson et al. | |
| 9,212,805 B2 * | 12/2015 | Reetz ......................... | A63J 5/00 |
| 9,420,248 B2 | 8/2016 | Velarde et al. | |
| 9,451,068 B2 | 9/2016 | Warren | |
| 9,494,807 B2 | 11/2016 | Jannard | |
| 9,619,201 B2 | 4/2017 | Jannard et al. | |
| 9,720,258 B2 | 8/2017 | Reyes | |
| 9,720,260 B2 | 8/2017 | Calilung et al. | |
| 10,222,617 B2 | 3/2019 | Jannard | |

(Continued)

*Primary Examiner* — Anthony J Daniels
(74) *Attorney, Agent, or Firm* — LaMorte & Associates P.C.

(57) ABSTRACT

A system and method for capturing images of an object upon which retroreflective materials have been applied, wherein at least some of the retroreflective materials appear to glow in the image or video being captured. An array of LEDs is provided that operates in different color frequency ranges. The color frequency ranges correspond to the reflectivity profile of the retroreflective materials that are applied to the object being imaged. The LEDs are attached to the camera, wherein the LEDs shine light in a same direction as the line of sight of the camera. The LEDs being activated during image capture can be varied. The light from the colored sets of LEDs causes retroreflective materials to appear. When recorded with the camera, the resulting images cause the retroreflective materials to glowing brightly in contrast to other objects in the captured image.

12 Claims, 5 Drawing Sheets

(56) References Cited

U.S. PATENT DOCUMENTS

| | | | |
|---|---|---|---|
| 2007/0030340 A1 | 2/2007 | Kitano et al. | |
| 2008/0203277 A1* | 8/2008 | Warszauer | H04N 5/2256 250/208.1 |
| 2011/0059798 A1* | 3/2011 | Pryor | G06F 3/011 463/37 |
| 2013/0038766 A1* | 2/2013 | Perlman | H04N 5/357 348/294 |
| 2016/0201888 A1* | 7/2016 | Ackley | G03B 21/14 362/276 |
| 2020/0154036 A1* | 5/2020 | Qian | H04N 5/2256 |

\* cited by examiner

SYSTEM AND METHOD FOR ADDING AUXILIARY LIGHTS TO A CAMERA TO CREATE FLUORESCENCE IN SELECTED FEATURES OF A CAPTURED IMAGE

RELATED APPLICATIONS

This application claims the benefit of U.S. Provisional Patent Application No. 63/060,562 filed Aug. 3, 2020.

BACKGROUND OF THE INVENTION

1. Field of the Invention

In general, the present invention relates to illumination systems having auxiliary lights that attach to a smartphone, tablet computer, or other similar handheld electronic device that contains both a screen and camera. The present invention also relates to the use of retroreflective materials. More particularly, the present invention relates to illumination systems having specialized lights that are used to illuminate retroreflective materials.

2. Prior Art Description

Portable battery powered lights have been in existence for over a century. During this long period of time, portable battery powered lights have been configured in numerous ways. For example, many smartphones have a flashlight feature, where the battery of the phone is used to power a bright LED for the purpose of illuminating an area. This same LED is also used to produce a flash of light when the smartphone is used to take a picture. The LEDs that are built into smartphones are typically designed to produce polychromatic white light. Due to the nature of the polychromatic light, the light produced by the LED readily mixes with surrounding ambient light. Accordingly, the beam of an LED is often impossible to detect in any area that is exposed to daylight or in a space that is well lit from other light sources.

Many handheld electronic devices, such as smartphones and tablet computers contain cameras that enable images and video to be digitally recorded by the device. In such devices, the LED used with the flashlight feature is also used as a flash while taking a digital image or as a spotlight when recording a digital video. Although the LEDs used to produce the light are commonly white, some devices contain colored LEDs. The colored LEDs are used to produce "soft lighting" to improve color tones in the image or video being recorded. Such devices with multicolored LEDs are exemplified in U.S. Patent Application Publication No. 2007/0030340 to Kitano and U.S. Pat. No. 9,420,248 to Velarde. Although such devices contain colored LEDs, the colored LEDs shine colored light with polychromatic white light to soften the white light. Alternatively, the prior art shines multiple colored LEDS together to produce polychromatic light with selected color hues.

It is common sense that an object can be more readily seen if the object is better illuminated than its surroundings. This is why flashlights are useful in finding objects in dark places. This concept can be specialized to systems that use retroreflective materials. In U.S. Pat. No. 8,746,914 to Nelson, an illumination system is disclosed that places monochromatic lights on a head mount or hat. The monochromatic lights help illuminate retroreflective materials that are applied to sports balls. In this manner, a sports ball becomes more illuminated than its surrounding, even when viewed in daylight. In this system, the increase in reflected luminance is subtle and affects all retroreflective material on the object being viewed.

The present invention discloses a unique illumination system that is specifically adapted for use with any smart device that has both a camera and screen, such as a smartphone, tablet or laptop. The illumination system makes targeted objects brighter than other untargeted objects during imaging. The illumination system also focuses a person's attention to specific objects in an imaged scene. The details of the present invention illumination system are described below.

SUMMARY OF THE INVENTION

The present invention is a system and method for capturing images and/or video of an object upon which retroreflective materials have been applied, wherein at least some of the retroreflective materials appear to glow in the image or video being captured.

An array of LEDs is provided. The array of LEDs contains various sets of LEDs that operate in different color frequency ranges. The different color frequency ranges selected for the set of LEDs correspond to the reflectivity profile of the retroreflective materials that are applied to the object(s) being imaged.

The object containing the retroreflective materials is imaged using a camera. The camera has a line of sight. An array of LEDs is attached to the camera. The array of LEDs is positioned to shine light in a same direction as the line of sight of the camera.

The colored sets of LEDs being activated during image capture can be varied. The light from the colored sets of LEDs causes the retroreflective materials to appear brighter in hues that correspond to the color profile of the incoming light. When recorded with the camera, the resulting images cause different areas of the retroreflective material glowing brightly in contrast to ambient light. The intensity and the hues of the glow can change over time as different sets of LEDs activate. The result is a unique glowing special effect in the image that is accomplished without the use of any image altering software.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system can be embodied in many ways, only one exemplary embodiment is illustrated. The exemplary embodiment is being shown for the purposes of explanation and description. The exemplary embodiment is selected in order to set forth one of the best modes contemplated for the invention. The illustrated embodiment, however, is merely exemplary and should not be considered as limiting when interpreting the scope of the appended claims.

Figure 1:
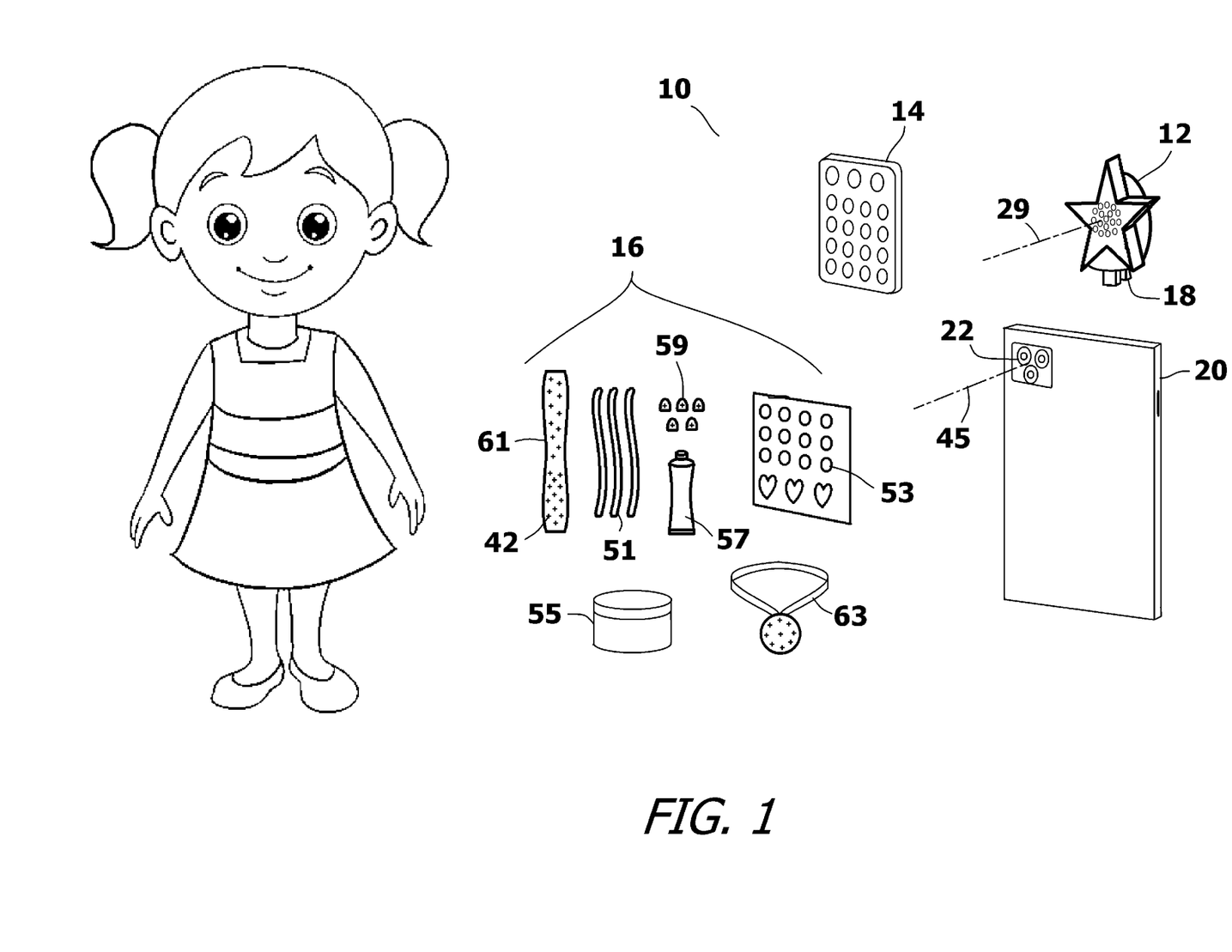
FIG. 1 is an exemplary schematic that shows the hardware requirements of the present invention image enhancement system.
Figure 2:
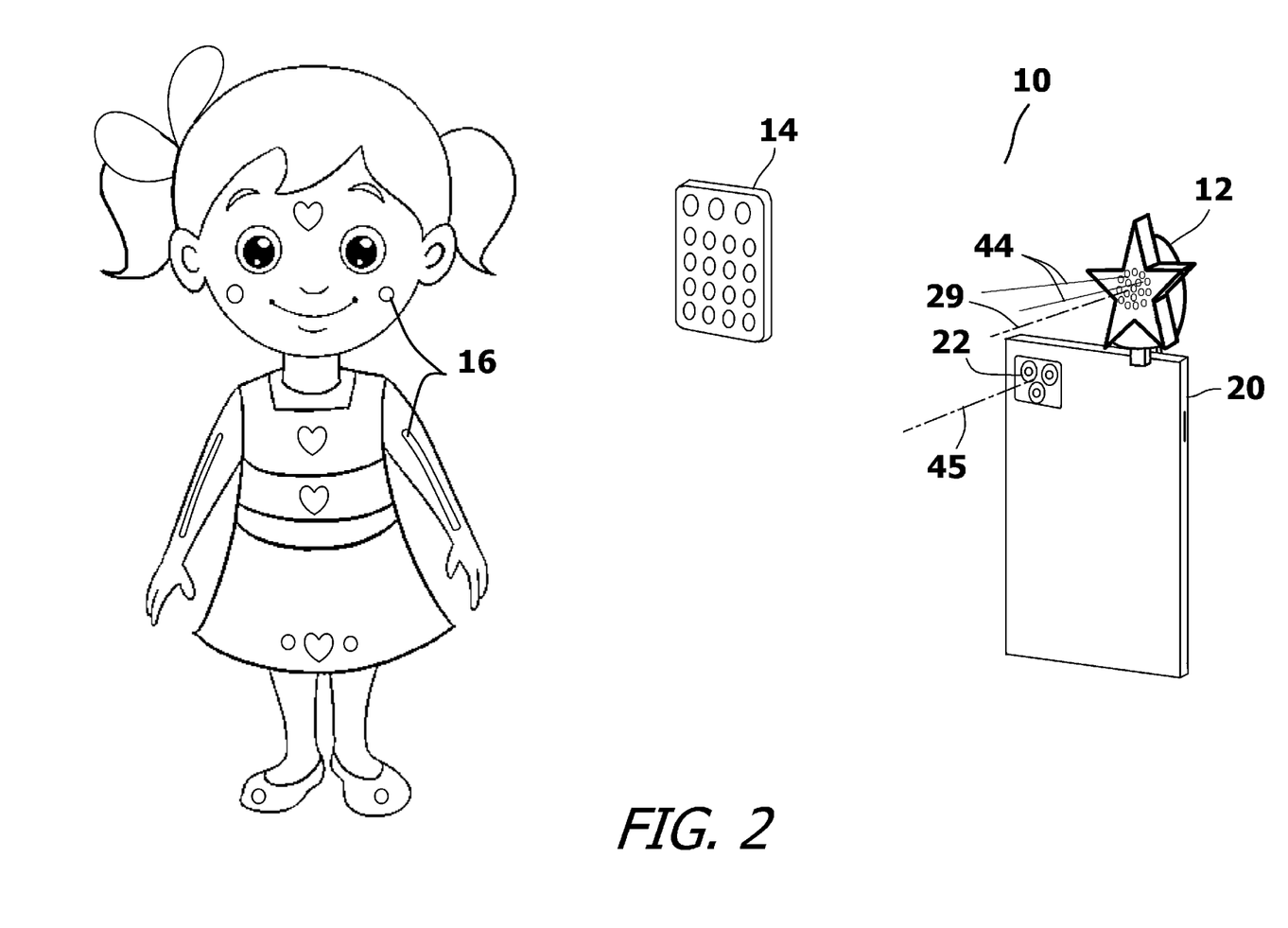
FIG. 2 shows the use of the present invention image enhancement system.

Referring to FIG. 1 in conjunction with FIG. 2, an image enhancement system 10 is shown. The image enhancement system 10 includes an auxiliary lighting assembly 12, a remote control 14, and a set of specialized retroreflective adornments 16. The image enhancement system 10 is used in conjunction with a commercially available smartphone 20. The smartphone 20 includes an integrated digital camera 22 for recording images and video. The smartphone 20 also has a screen (later shown in FIG. 5) that can be used to visualize what the camera 22 is imaging. The smartphone 20 is capable of recording and transmitting recorded images and video.

The auxiliary lighting assembly 12 contains a clip 18. The clip 18 enables the auxiliary lighting assembly 12 to be mechanically attached to the smartphone 20 or to any protective shell that might surround the smartphone 20. The clip 18 can have many forms. The clip 18 can be a spring clip, such as is illustrated. Clips 18 that are manually tightened can also be used. For the purpose of this disclosure, the clip 18 is meant to include any device that can mechanically attach the auxiliary lighting assembly 12 to the smartphone 20 so that the auxiliary lighting assembly 12 is fixed in place and moves as a unit with the smartphone 20.

Figure 3:
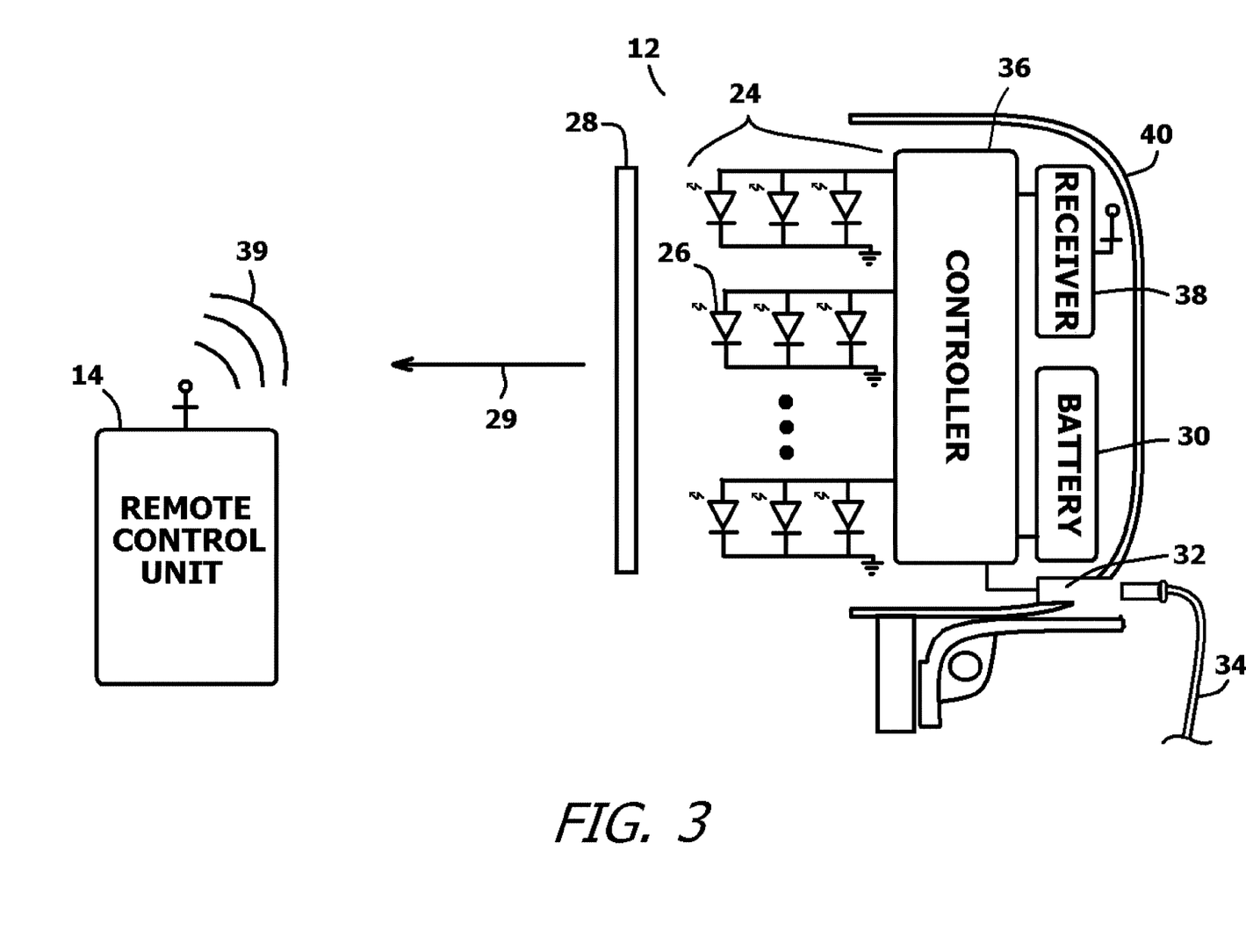
FIG. 3 shows a schematic of the auxiliary lighting assembly used within the image enhancement system.

Referring to FIG. 3 in conjunction with FIG. 2, it can be seen that auxiliary lighting assembly 12 contains an array 24 of LEDs 26 that is set behind a diffuser 28. The LEDs 26 are arranged so that they shine light through the diffuser 28 in a primary direction. When the auxiliary lighting assembly 12 is attached to the smartphone 22 with the clip 18, the primary direction of the light should coincide with the direction of view for the camera 22. In this manner, the light produced by the LEDs 26 will illuminate the same area that is being imaged by the camera 22.

Figure 4:
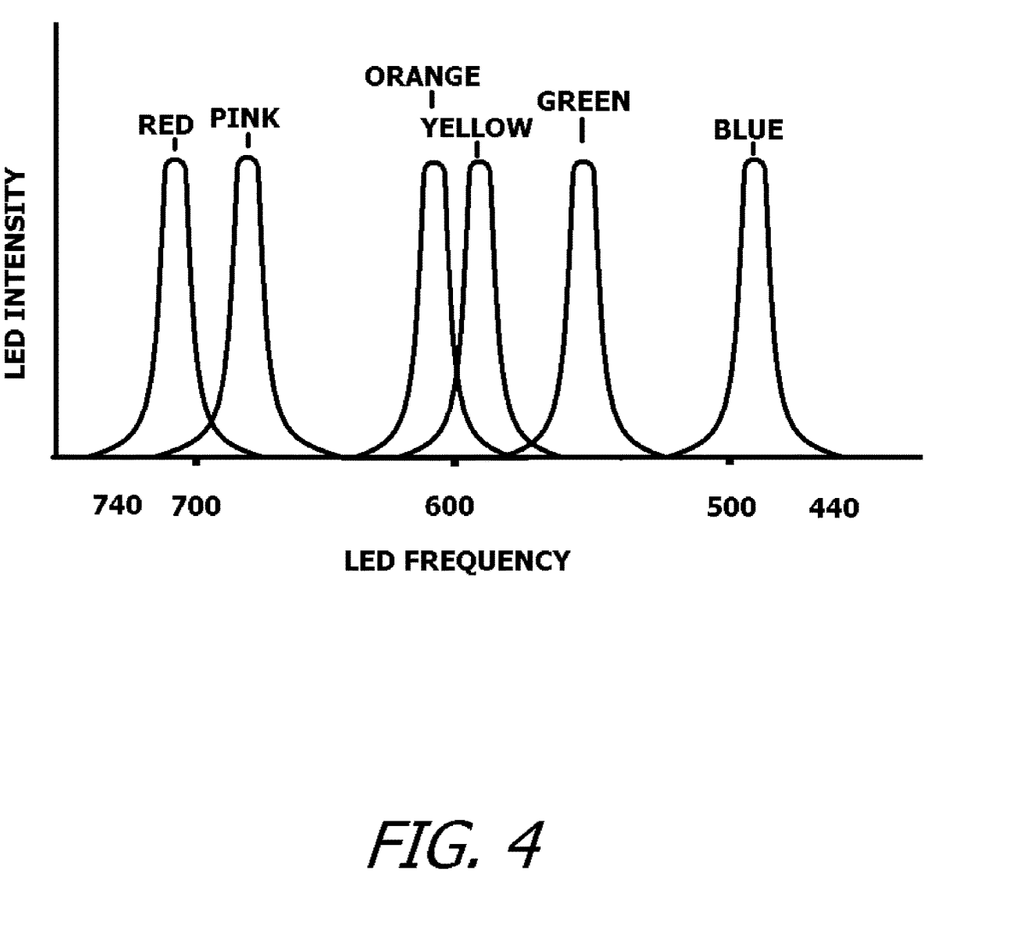
FIG. 4 shows the frequencies of light produced by the auxiliary lighting system.

The LEDs 26 in the LED array 24 are colored. Although LEDs 26 of different colors are used in the LED array 24, each individual LED 26 is monochromatic or as monochromatic as practical given the light profiles of commercially available colored LEDs. Referring to FIG. 4, it can be seen that the LEDs 26 utilized within the auxiliary lighting assembly 12 emit light in the primary light frequencies for a variety of colors. Most any color can be represented. However, traditional fluorescent primary colors, such as red, pink, orange, yellow, green and blue, are preferred.

Returning to FIG. 3, it can be seen that the LEDs 26 are powered by one or more batteries 30. The batteries 30 can be rechargeable or replaceable. If rechargeable batteries 30 are used, the batteries 30 connect to a recharging port 32. The recharging port 32 can receive a cable 34 that connects the recharging port 32 to an external power source. In the preferred embodiment, a cable 34 can be provided that directly interconnect the auxiliary lighting assembly 12 to a secondary device.

The activation of the various LEDs 26 is regulated by a controller 36. The controller 36 is connected to a receiver 38. The receiver 38 receives control signals 39 from the remote control unit 14. The remote control unit 14, via the controller 36, can activate and deactivate any of the LEDs 26 in the LED array 24. The remote control unit 14, via the controller 36, can also control the activation time of the LEDs 26 and various patterns of activation and deactivation. As such, it will be understood that by using the remote control unit 14, a user can activate LEDs 26 of one color and/or LEDs 26 of multiple colors. The color intensity of the light produced by the LEDs 26 can be varied by selectively activating and deactivating the LEDs 26 of different colors.

The LED array 24, controller 36 and batteries 30 of the auxiliary lighting assembly 12 are held within a housing 40. The clip 18 attaches the housing 40 to the smartphone 20. In the shown embodiment, the housing 40 is star-shaped. This shape is merely exemplary. It will be understood that the housing 40 can have any shape provided it retains the required components and enables the LED array 24 to shine in the same primary direction as the camera 22.

Referring to FIG. 1, it can be seen that a variety of retroreflective adornments 16 are provided. The retroreflective adornments 16 are covered, at least on one side, with retroreflective materials 42. The retroreflective materials 14 use micro-prisms or reflective spherical beads that are bound in a polymer or mixed in an emulsion. The selected microprims and/or reflective spherical beads determine the reflective profile of the retroreflective material. That is, what color frequencies are efficiently reflected, while others are absorbed. The polymer/emulsion is engineered have its highest reflectivity in specific bands of light frequencies. The retroreflective materials 42 absorb light energy in the color frequencies outside the selected light frequencies. However, retroreflective materials 42 reflect nearly all the incoming light having the selected color frequencies. For the purpose of this specification, it should be understood that the retroreflective materials 42 are engineered to reflect light frequencies that correspond to the primary frequencies of the LEDs 26 used within the LED array 24.

The retroreflective materials 42 are designed to reflect light back in the same direction from which it arrives regardless of the angle of incidence between the incoming light and the retroreflective materials 42. However, the intensity of the reflected light is directly proportional to the angle of incidence. It will therefore be understood that the intensity of the light reflected by the retroreflective materials 42 is most intense when the retroreflective materials 42 are observed directly in line with the direction of illuminating light. This produces an angle of incidence that is zero. In the application of the present invention, there are multiple beams of light 44 that are created by the LEDs 26. Each of the beams of light 44 reflect from the retroreflective materials 42. It will be understood that the camera 22 in the smartphone 20 receives the most reflected light from the beams of light 44 created by the LED array 24. This is because the beams of light 44 lay in line with the line of sight 45 for the camera 22. The intensity of the light reflected from the beams of light 44 is greater than the reflected light from ambient light due to of the differences in the angles of incidence.

The camera 22 in the smartphone 20 receives reflected light from the various beams of light 44 simultaneously. The result is a reflection intensity perceived by the camera 22 aligned with the LEDs 26 that is over twice as bright as the reflected ambient light. Furthermore, the reflection intensity perceived by the camera 22 is far greater than what would be perceived by any other observer who is not aligned with the LEDs 26. This is due to of the greater angle of incidence between the beams of light 44 and the line of sight 45 of the camera 22.

The retroreflective adornments 16 are objects and/or compositions that can be worn on the body or clothing. The retroreflective adornments 16 include, but are not limited to, ribbons 51, shaped stickers 53, skin makeup 55, face paint 57, nail covers 59, head bands 61 and faux jewelry 63. Some of the retroreflective adornments 16, such as ribbons 51 and stickers 53, may include tacky adhesive to assist in attaching the retroreflective adornments 16 to a person or to a person's clothing.

Figure 5:
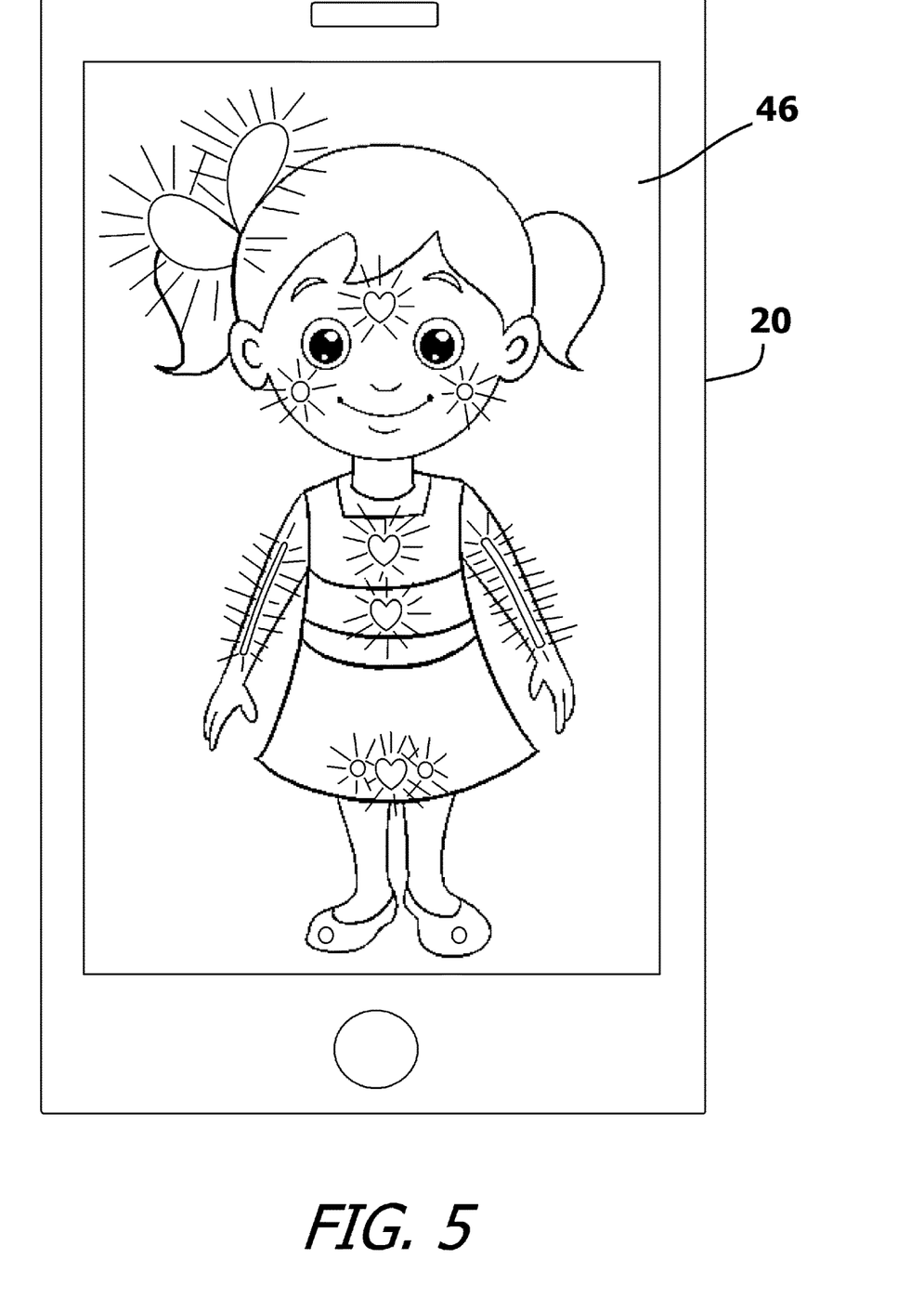
FIG. 5 shows an exemplary image created by the exemplary embodiment of FIG. 2.

Referring to FIG. 5 in conjunction with FIG. 1 and FIG. 2, it will be understood that to utilize the image enhancement system 10, a user attaches the auxiliary lighting assembly 12 to a smartphone 20. The auxiliary lighting assembly 12 is oriented so that the LEDs 26 shine light in the same direction as the line of sight 45 for the camera 22 of the smartphone 20. Separately, a person places the retroreflective adornments 16 on a person or object. In the illustrated embodiment, the retroreflective adornments 16 are applied to the skin and clothing of a child.

The various retroreflective adornments 16 are coated in whole, or in part, with the retroreflective material 42. The retroreflective material used by the retroreflective adornments 16 is highly reflective to the colored light that can be produced by the LED array 24. Using the remote control unit 14, the lighting of the LEDs 26 can be controlled. As the LEDs 26 in the LED array 24 are lit, then all the retroreflective adornments 16 will appear to glow in the image 46 captured by the camera 22 of the smartphone 20. This is because the retroreflective materials 42 on the retroreflective adornments 16 are engineered to reflect the particular frequencies of light being produced by the LED array. The result is that the retroreflective adornments 16 shine brighter than other objects in the image 46 captured by the camera 22.

If the remote control unit 14 lights only LEDs 26 of one color, then only the areas on the retroreflective adornments 16 will primarily reflect back that same color. The brightness of the shine is proportional to the brightness of the shining LEDs 26. As such, using the remote control unit 14, a user can shine different colored LEDs 26. This will produce an image 46 where different retroreflective adornments 16 will shine brightly in the color hue that corresponds to the LEDs 26 being activated at that time. Furthermore, the intensity of the shine can be controlled by adjusting the number of LEDs 26 being activated.

The result is an image 46 or video that can be captured by the camera 22 of the smartphone 20, where areas of a person brightly glow in relation to ambient lighting. This special effect requires no software applications within the smartphone 20. Rather, the effects are real and are merely recorded by the smartphone 20 in order to create specialized images or videos.

It will be understood that the embodiment of the present invention that is illustrated and described is merely exemplary and that a person skilled in the art can make many variations to that embodiment. All such embodiments are intended to be included within the scope of the present invention as defined by the appended claims.

What is claimed is:

1. A method of capturing an image of an object upon which retroreflective materials have been applied, wherein said retroreflective materials appear to glow in said image when captured, said method comprising the steps of:
   providing a remote control unit;
   providing an auxiliary lighting assembly with a mounting clip, said auxiliary lighting assembly containing an array of LEDs that are responsive to said remote control unit, wherein said array of LEDs contains LEDs that operate at different color frequencies, wherein said different color frequencies are reflected by said retroreflective materials that are applied to said object;
   providing a camera for capturing said image, wherein said camera has a line of sight;
   utilizing said mounting clip attachment to connect said auxiliary lighting assembly to said camera, wherein said array of LEDs shine light in a same direction as said line of sight of said camera;
   utilizing said remote control unit to selectively light only some of said LEDS in said array of LEDs;
   wherein light from said array of LEDs reflects from said retroreflective materials on said object back to said camera causing said retroreflective materials to appear brighter in said image than areas of said object that lack said retroreflective materials.

2. The method according to claim 1, further including selectively controlling said array of LEDs with said remote control unit to shine light in only one of said different color frequencies.

3. The method according to claim 1, further including selectively controlling said array of LEDs with said remote control unit to shine light in selected color frequencies over a period of time.

4. The method according to claim 1, wherein providing said camera includes providing a smartphone that contains said camera.

5. The method according to claim 4, wherein attaching said array of LEDs to said camera includes attaching said mounting clip of said auxiliary lighting assembly to said smartphone.

6. The method according to claim 1, further including providing batteries in said auxiliary lighting assembly for powering said array of LEDs.

7. The method according to claim 6, further including providing an external cable for powering said batteries.

8. A method of capturing video of an object upon which retroreflective materials have been applied, wherein said at least some of said retroreflective materials appear to glow in said video when viewed, said method comprising the steps of:
   providing a remote control unit;
   providing an auxiliary lighting assembly with a mounting clip, said auxiliary lighting assembly containing an array of LEDs that are responsive to said remote control unit, wherein said array of LEDs contains various sets of LEDs that operate in different color frequency ranges, wherein said different color frequency ranges are reflected by said retroreflective materials that are applied to said object;
   providing a camera for capturing said video, wherein said camera has a line of sight;
   attaching said auxiliary lighting assembly to said camera with said mounting clip, wherein said array of LEDs is positioned to shine light in a same direction as said line of sight of said camera;
   controlling said array of LEDs with said remote control unit to shine light in different color frequencies over a period of time during said video capturing by said camera, wherein light from said sets array of LEDS causes said retroreflective materials to appear brighter in said video than areas of said object that lack said retroreflective materials.

9. The method according to claim 8, wherein providing said camera includes providing a smartphone that contains said camera.

10. The method according to claim 9, wherein attaching said auxiliary lighting assembly to said camera includes attaching said mounting clip to said smartphone.

11. The method according to claim 10, further including providing batteries in said auxiliary lighting assembly for powering said array of LEDs.

12. A method of capturing video of an object, comprising the steps of:
- providing a supply of adornments, wherein said adornments contain retroreflective materials;
- applying at least some of said adornments to an object;
- providing an auxiliary lighting assembly with an external mounting clip, wherein said auxiliary lighting assembly houses an array of LEDs, wherein said array of LEDS contains various sets of LEDs that operate in different color frequency ranges, and wherein said different color frequency ranges are reflected by said retroreflective materials that are applied to said object;
- providing a camera for capturing said video, wherein said camera has a line of sight;
- attaching said auxiliary lighting assembly to said camera with said external mounting clip, wherein said array of LEDs is positioned to shine light in a same direction as said line of sight of said camera;
- individually varying said sets of LEDs being activated during said video with a remote control, wherein light from said sets of LEDs illuminates said retroreflective materials in said video at different times.

\* \* \* \* \*